United States Patent [19]

Hicks et al.

[11] Patent Number: 5,675,552
[45] Date of Patent: Oct. 7, 1997

[54] SONAR APPARATUS HAVING A STEERABLE BEAM

[75] Inventors: Charles L. Hicks, Santa Cruz, Calif.; James Carl Bartz, Kailua, Hi.

[73] Assignee: Interphase Technologies, Inc., Soquel, Calif.

[21] Appl. No.: 537,385

[22] Filed: Oct. 2, 1995

[51] Int. Cl.$^6$ ............................................. G01S 15/96
[52] U.S. Cl. ..................................... 367/103; 367/111
[58] Field of Search ................................ 367/103, 105, 367/108, 107, 111, 900, 98, 112

[56] References Cited

U.S. PATENT DOCUMENTS

| | | | |
|---|---|---|---|
| 3,617,996 | 11/1971 | Herbert | 367/105 |
| 3,740,705 | 6/1973 | Lowrance | 367/112 |
| 3,886,487 | 5/1975 | Walsh et al. | 367/112 |
| 4,001,763 | 1/1977 | Kits Van Heyningen | 367/103 |
| 4,255,797 | 3/1981 | Stocklin | 367/103 |
| 4,460,987 | 7/1984 | Stokes et al. | 367/103 |
| 4,829,492 | 5/1989 | Choi et al. | 367/108 |
| 4,841,492 | 6/1989 | Russell | 367/105 |
| 4,920,520 | 4/1990 | Gobel et al. | 367/99 |
| 4,935,906 | 6/1990 | Baker et al. | 367/111 |
| 5,142,502 | 8/1992 | Wilcox et al. | 367/88 |
| 5,142,505 | 8/1992 | Peynaud | 367/103 |
| 5,168,473 | 12/1992 | Parra | 367/99 |
| 5,184,330 | 2/1993 | Adams et al. | 367/111 |
| 5,303,204 | 4/1994 | Wertsberger | 367/99 |

OTHER PUBLICATIONS

American Pioneer Dualscan scanning fish–finder sonar, American Pioneer, Seattle, Washington.
Ametak (Ketema) SeaProbe 1220 harbor intruder detection sonar, Ametek, 1988, El Cajon, California.
Eagle Ultra III 3D double–wide fish–finder, Lowrance Electronics, Inc., 1994, Catoosa, Oklahoma.
Furuno CSH–55 full–circle multi–beam color scanning sonar, Furuno Electric Co., Ltd., Nishinomiya City, Japan.
Incastec EchoPilot FLS–2 forward looking scanning sonar, Incastec Associates Ltd., Seattle, Washington.
MAQ Sonar Mini–MAQ multi–beam multi–frequency scanning sonar, MAQ Sonar Company, Lunenburg, Ontario, Canada.
Marconi–UDI Sona Vision 4000 scanning sonar, Offshore Engineer/Marconi, Sep. 1991 est.
Marine Electronics Marine Scan 1256 and 4512 precision multi–beam sonars, Marine Electronics Ltd, Guernsey, Channel Islands.
MarineStar AquaScan 1000 and AQ300LC scanning and downlooking sonar, MarineStar, Inc., 1990, Indianapolis, Indiana.
Odom Echoscan multi–beam echosounder, Odom Hydrographic Systems, Baton Rouge, Louisiana.
Reson Seabat 9001 multi–beam bathymetric sonar, Cindy Camillucci, Sep. 1994, Goleta, California.
Sea Beam 1180 shallow–water multi–beam survey sonar, SeaBeam Instruments, East Walpole, Massachusetts.
Simrad Mesotech 990/997 fast scan sonar, Simrad Mesotech Systems Ltd, Oct. 1991, Port Coquitlam, B.C., Canada.
TriScan Sona–Scan RS 1001 AM sonar, Tritech International Ltd, Aberdeen, United Kingdom.
Wesmar TCS700E forward scanning trawl sonar, Wesmar, Seattle, Washington.

*Primary Examiner*—Daniel T. Pihulic
*Attorney, Agent, or Firm*—David R. Gildea

[57] ABSTRACT

A sonar apparatus using a phased array technique for steering an acoustical beam for scanning an underwater area. The sonar apparatus includes a scanning transducer having multiple elements for transmitting and steering the acoustical beam and receiving its reflection from an object, an electronic control circuit for generating steering information and computing a relative location of the object, and an input/output section for displaying the relative location to a user. The control circuit includes a software level/align control for compensating for mis-leveling or mis-alignment during installation, a scan control capable of selecting a scan center direction and a scan width in one degree increments, a forward gain control for optimizing the sensitivity of the sonar apparatus in a forward looking scan, and a combination of a time variable gain control and an autorange control for minimizing the reflection of sidelobes of the acoustical beam.

39 Claims, 7 Drawing Sheets

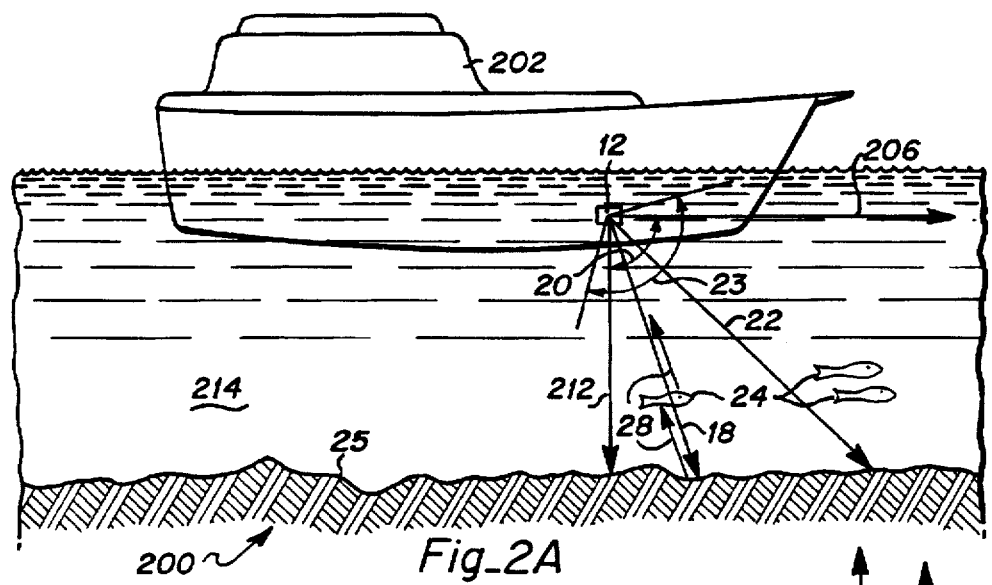
Fig_2A
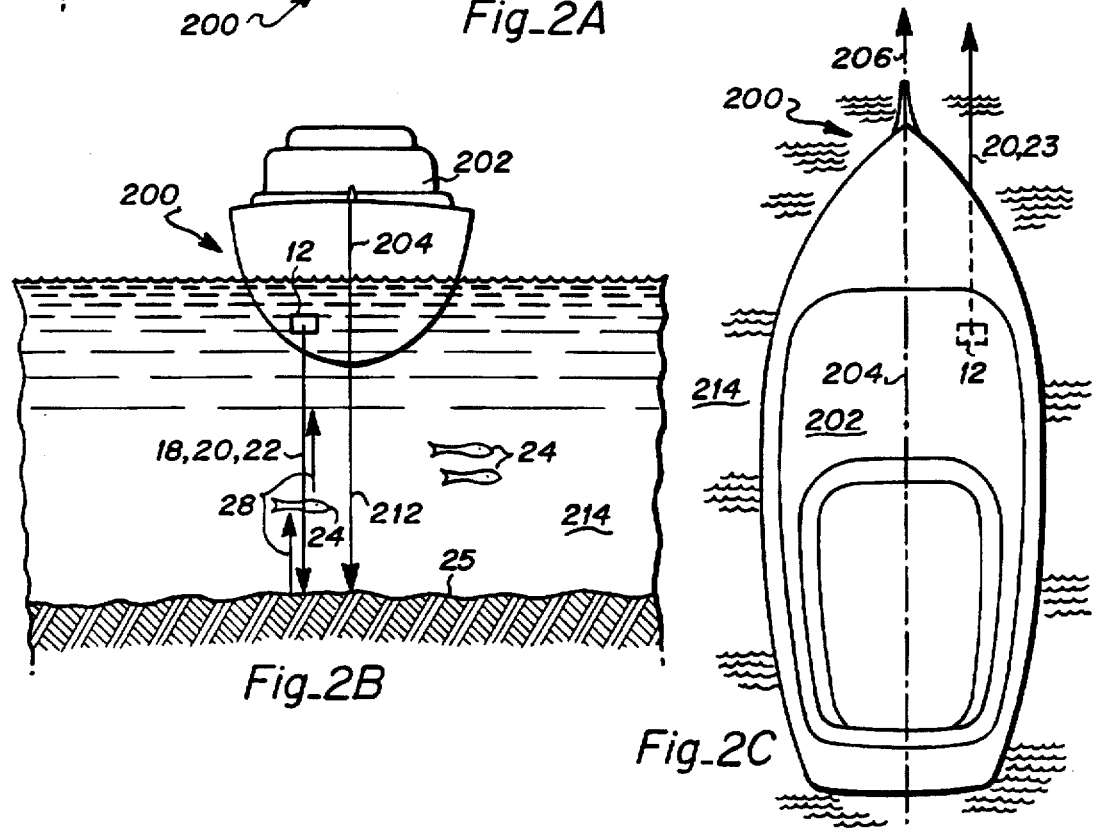
Fig_2B
Fig_2C

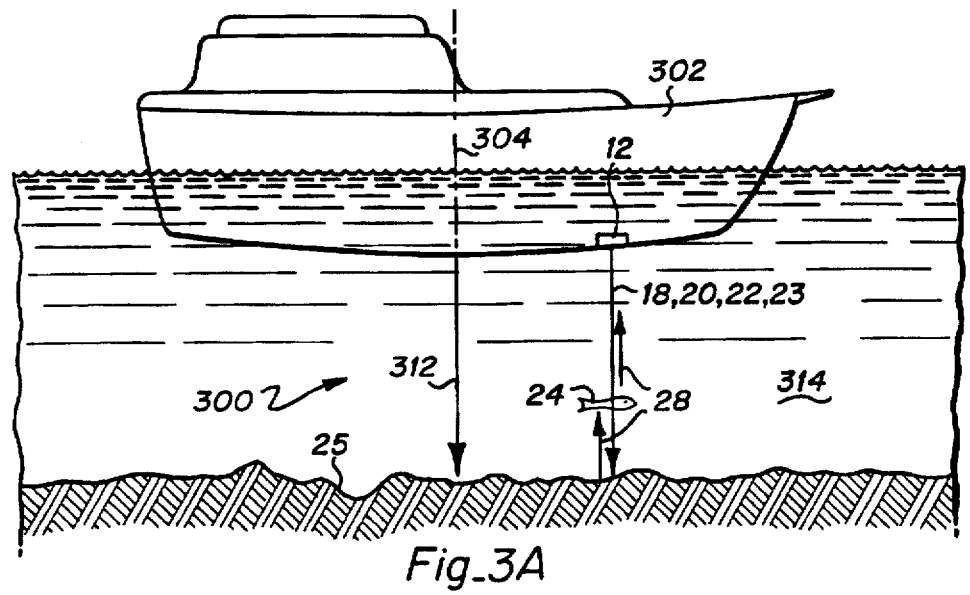
Fig_3A
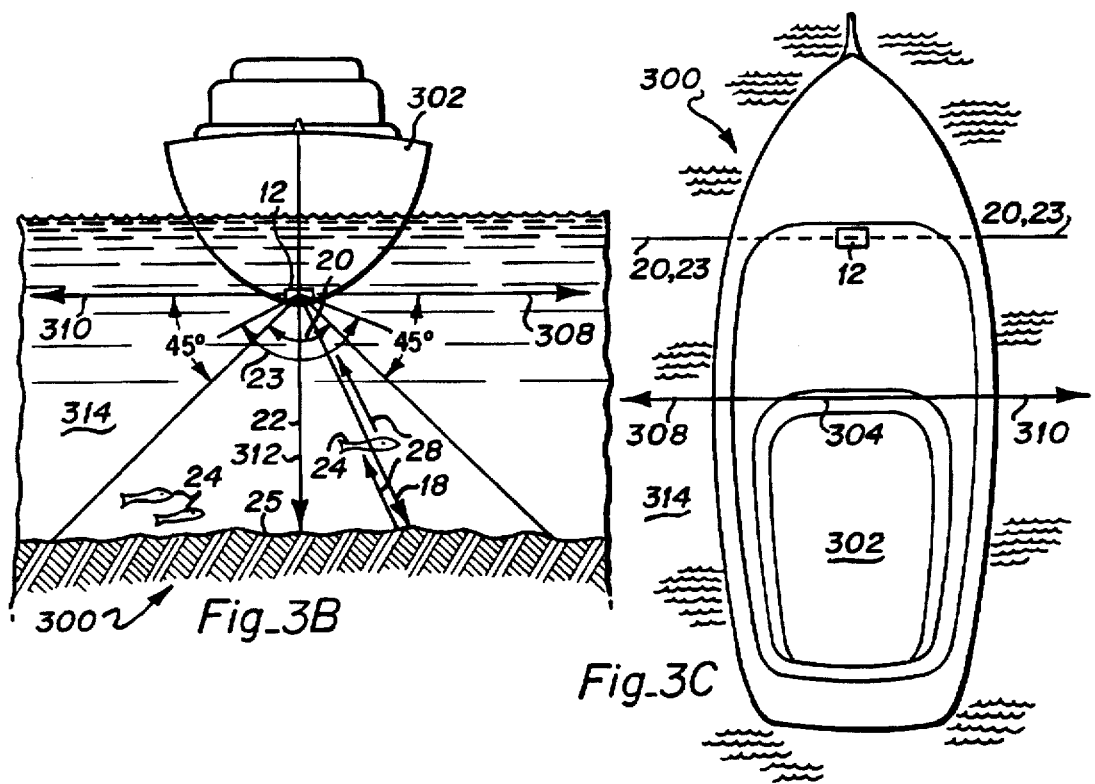
Fig_3B
Fig_3C

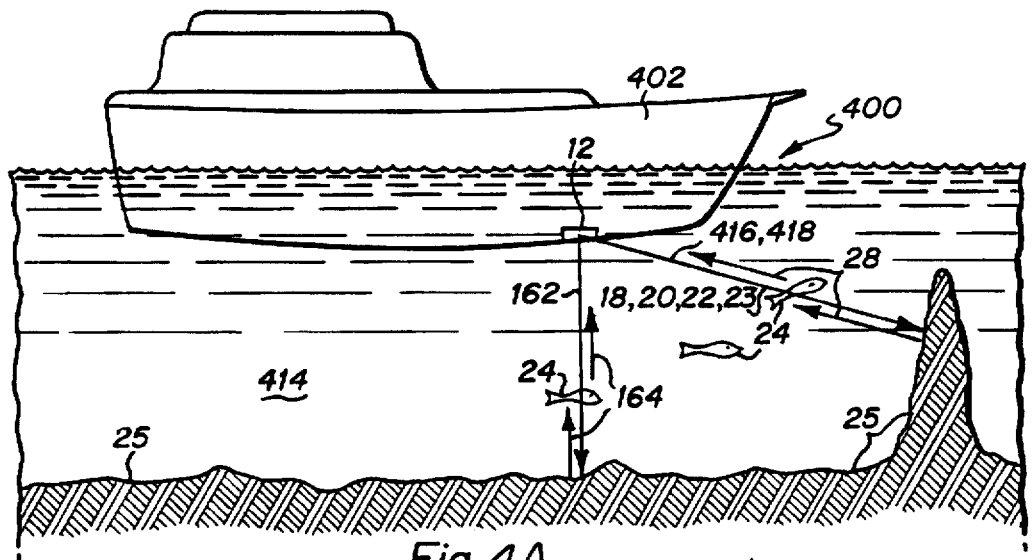
Fig._4A
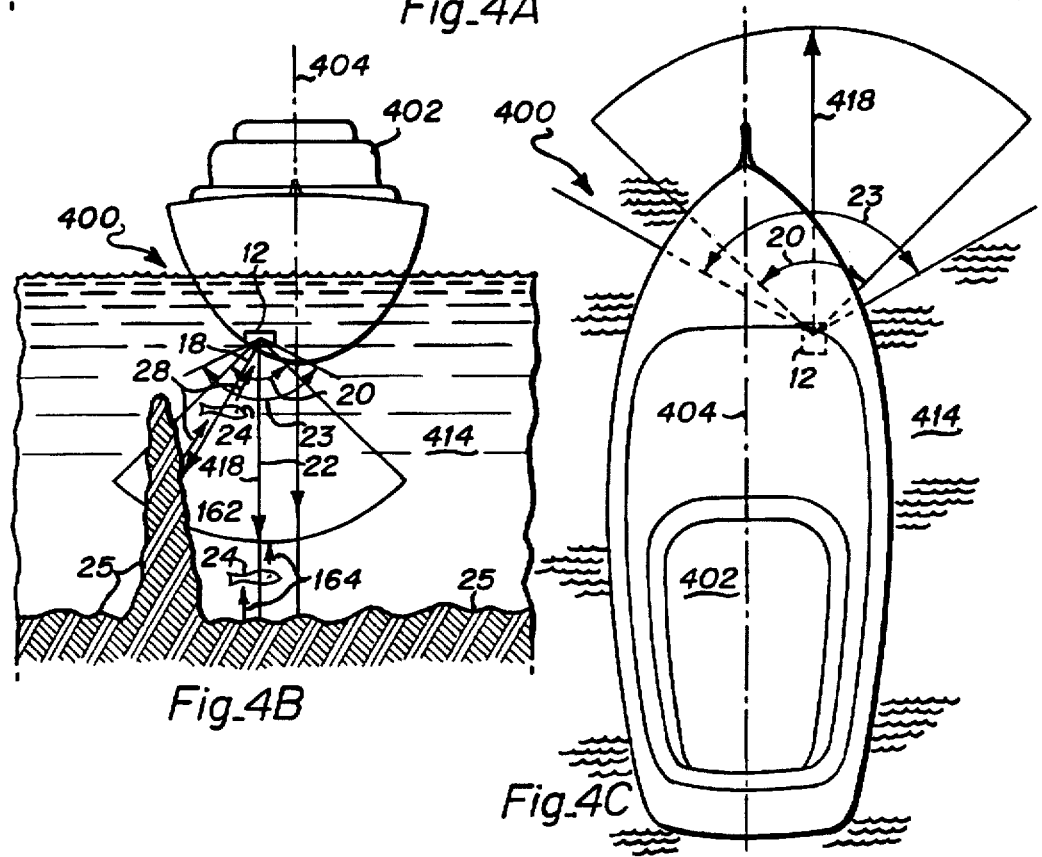
Fig._4B
Fig._4C

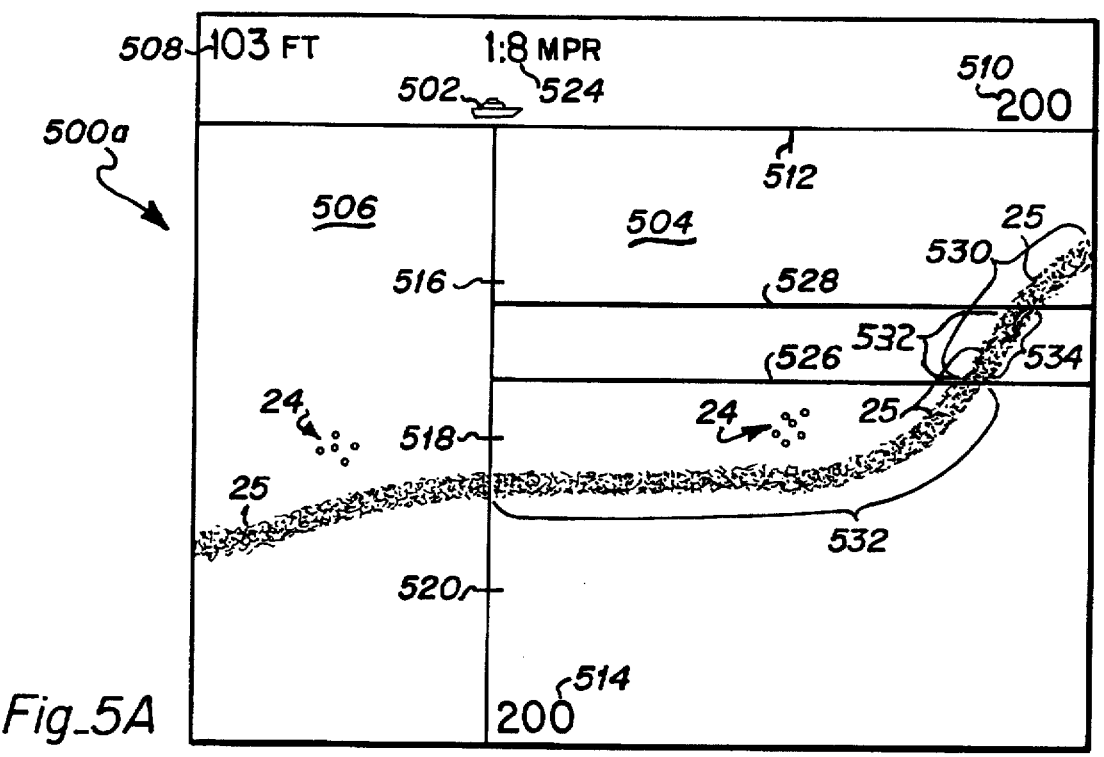
Fig_5A
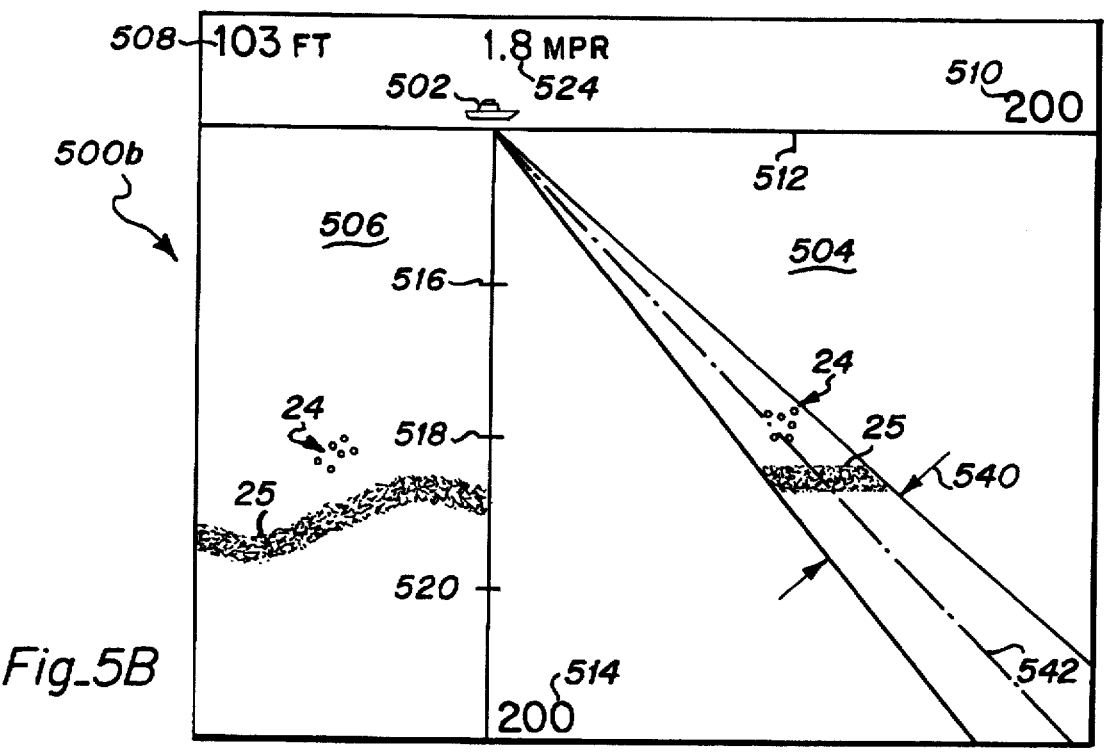
Fig_5B

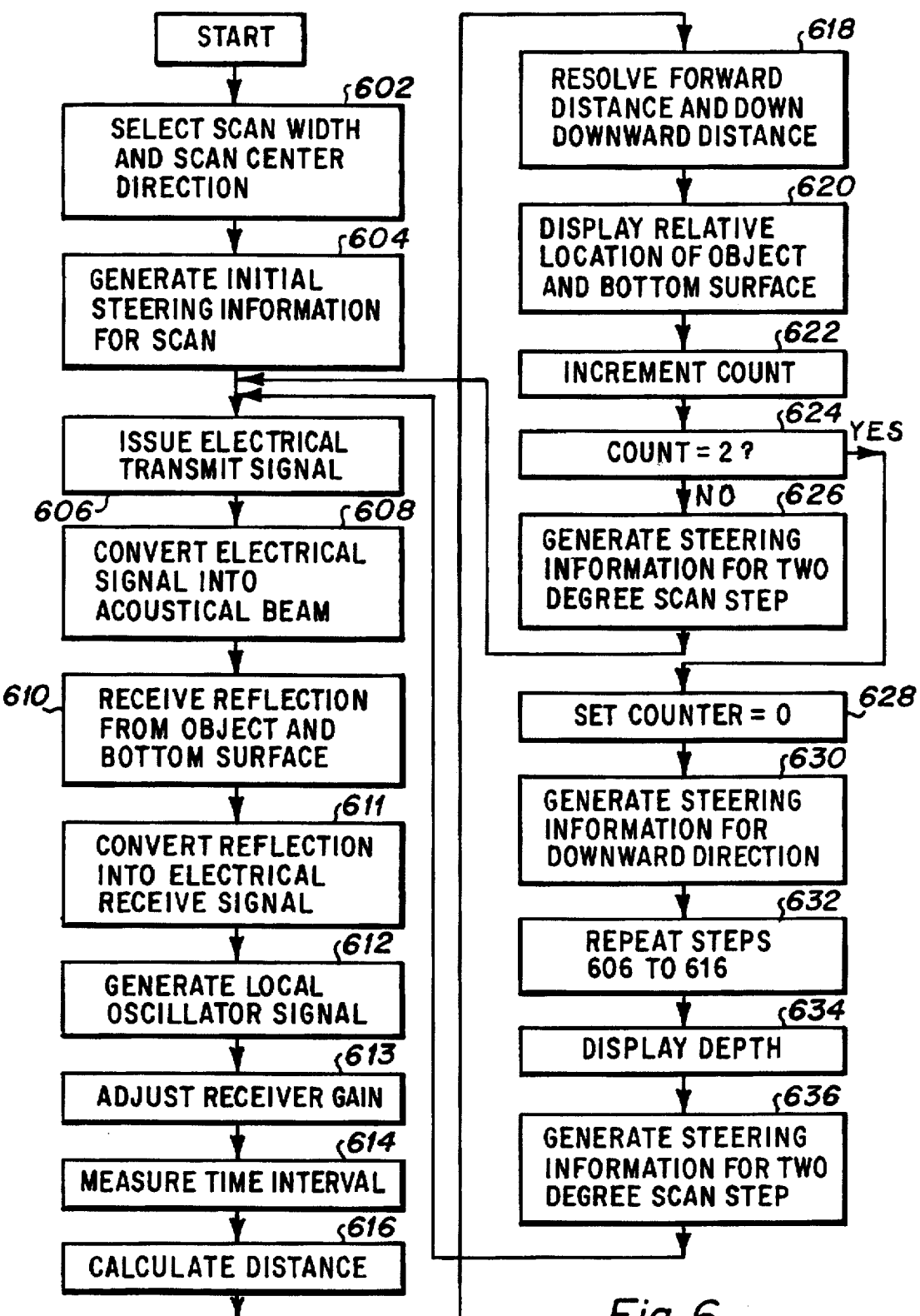
Fig_6

SONAR APPARATUS HAVING A STEERABLE BEAM

BACKGROUND OF THE INVENTION

1. Field of the Invention

The invention relates generally to sonar apparatus and more particularly to a sonar fishfinder/depthfinder having a capability of steering an acoustical beam.

2. Description of the Prior Art

Present day fishfinder/depthfinders all work on a principle developed during W.W. II called "sonar", where an acoustical beam of sonic pulses is used to detect the presence and distance of an underwater object. During the 1950's several sonar products were developed and marketed to fishermen and boating enthusiasts which used sonar to detect the distance to the bottom (depth) and to indicate the presence of any intervening objects such as fish.

The original product, called a "flasher" displayed information via a light bulb mounted on a spinning disk. The flasher used an acoustic transducer mounted to the underside of a boat. The light was connected to flash when an acoustical pulse was transmitted by the transducer and again when the transducer detected a return echo from the bottom or a fish. Because the time between the transmitted pulse and the return echo was proportional to the distance that the acoustical beam had traveled, the arc that the disk had spun between the flashes could be calibrated to determine the depth to the bottom or the fish. These products were very popular and are still being sold today.

Over the years there have been several enhancements to the technology including the use of strip chart recorders, cathode ray tubes (CRTs), and liquid crystal displays (LCDs) and circuitry to permit the retention and display of many acoustical pulses. The resulting display is a graphical representation of a history of the bottom depth beneath the boat and the location of any objects or fish that intervened. Fishermen and boaters have found these products to be extremely useful for safe navigation in shallow waters and for finding the precise locations of fish and fish supporting underwater structures.

In these sonar products, the acoustical beam illuminates a small cone beneath the boat. If the boat happens over a school of fish or a submerged object, the sonar will detect and display the echo from that fish or object, but targets outside the cone are not detected and remain invisible to the user. Fishermen and boaters have long recognized this limitation and have had a strong interest in detecting the presence of objects over a larger area underwater, especially forward of the boat. Several workers have tried to overcome this limitation by modifying the existing sonar technology. Sonar products are in use in which the transducer is mounted on a motorized shaft to be steerable or which use multiple separately mounted transducers facing different directions. Each of these techniques offers some degree of improvement for increasing the underwater area that can be viewed but each has further limitations due to increased cost and complexity and potential reliability problems .of the moving parts in the motorized shaft.

SUMMARY OF THE INVENTION

It is therefore an object of the present invention to provide a simple and inexpensive sonar apparatus using an electronic circuit for steering an acoustical beam for viewing a large underwater area.

Another object is to provide a sonar apparatus having fine incremental control for a scan width and a scan center direction for steering the acoustical beam.

Another object is to provide a first embodiment of a sonar apparatus capable of scanning a forward looking planar sector from directly forward to directly downward.

Another object is to provide a second embodiment of a sonar apparatus capable of scanning a downward looking planar sector from forty-five degrees to the left to forty-five degrees to the right.

Another object is to provide a third embodiment of a sonar apparatus capable of scanning a forward sloping plane from forty-five degrees left to forty-five degrees right.

Another object is to provide a sonar apparatus having a simultaneous display of a planar scan sector and a historical downward looking track.

Another object is to provide a sonar apparatus having a combination of a time variable gain for increasing a sensitivity to a reflection of the acoustical beam as the time interval increases after the acoustical beam is transmitted and a distance autorange for increasing a full-scale distance range as the actual distance to a bottom surface increases.

Another object is to provide a sonar apparatus having a sensitivity to a reflection of the acoustical beam that is adjusted according to a weighted average of the energy received in a reflection from the acoustical beam at a current direction and the energy received in a reflection from the acoustical beam at a previous direction.

Another object is to provide a sonar apparatus having a shallow alarm detector to indicate the presence of a bottom surface and/or object having a location above a selectable shallow alarm depth.

Another object is to provide a sonar apparatus having a deep alarm detector to indicate the presence of a bottom surface and/or object having a location below a selectable deep alarm depth.

Another object is to provide a sonar apparatus having a zone detector to indicate the presence of a bottom and/or object within a zone above the shallow alarm depth and below the deep alarm depth.

Another object is to provide a sonar apparatus having a level/align adjustment for adjusting the boundaries of a planar scan sector.

Another object is to provide a sonar apparatus using a phased array technique for steering an acoustical beam.

Another object is to provide a sonar apparatus using a phased array technique for receiving a reflection of the acoustical beam.

Briefly a preferred embodiment of the sonar apparatus of the present invention includes a scanning transducer having multiple elements for transmitting and steering an acoustical beam and receiving its reflection from an object, an electronic control circuit for generating steering information and computing a relative location of the object, and an input/output section for displaying the relative location to a user. In a first embodiment, the scanning transducer is mounted and oriented for scanning a forward plane from directly forward to directly downward. In a second embodiment, the scanning transducer is mounted and oriented for scanning a left-right plane from forty-five degrees left of directly downward to forty-five degrees right of directly downward. In a third embodiment, the scanning transducer is mounted and oriented for scanning a forward sloping plane from forty-five degrees left to forty-five degrees right of a forward sloping direction. The forward sloping plane is angled slightly downward from the horizontal plane. The third embodiment further includes a downward-directed transducer.

An advantage of the present invention is that the sonar apparatus uses an electronically steered acoustical beam for viewing a large area underwater thereby eliminating the expense, complexity, and potentially high failure rate of the moving parts of multiple transducers or a transducer mounted on a motorized shaft.

Another advantage is that the sonar apparatus has fine incremental control of a scan width and a scan center direction to enable a user to precisely select an area to be scanned.

Another advantage is that the sonar apparatus in a first embodiment can detect and measure the distance to the bottom and/or objects, such as underwater hazards or fish, forward and below a boat by scanning a forward looking planar sector from directly forward to downward.

Another advantage is that the sonar apparatus in a second embodiment can detect and measure the distance to the bottom and/or objects, such as underwater hazards or fish, athwartship and below a boat by scanning a downward looking planar sector from left to right.

Another advantage is that the sonar apparatus in a third embodiment can detect and measure the distance to the bottom and/or objects, such as underwater hazards or fish, forward of a boat by scanning a forward looking planar sector from left to right.

Another advantage is that the sonar apparatus enables a user to view a scan sector and simultaneously view a historical record of the bottom and/or objects that have passed beneath a boat.

Another advantage is that the sonar apparatus minimizes the effect of sidelobe reflections by the combination of the time variable gain for increasing the sensitivity as the time interval after the transmission of the acoustical beam increases and the distance autorange for decreasing the full-scale distance range as the depth of the bottom surface beneath a boat decreases.

Another advantage is that the sonar apparatus uses a forward gain control for adjusting the sensitivity to minimize the detection of false objects and maximize the detection of the true bottom.

Another advantage is that the sonar apparatus provides an alarm to indicate the presence of a hazard located above a selectable shallow alarm depth.

Another advantage is that the sonar apparatus provides an alarm to indicate the presence of a hole beneath a selectable deep alarm depth.

Another advantage is that the sonar apparatus provides an alarm to indicate the presence of an object, such as a fish, in a selectable zone between the shallow alarm depth and the deep alarm depth.

Another advantage is that the sonar apparatus levels and/or aligns a planar scan sector to compensate for mis-leveling or mis-alignment of the mounting of the transducer, thereby preventing a false measurement of a sloping bottom or a false location of an object.

Another advantage is that the sonar apparatus is inexpensive and simple due to the use a of phased array technique for steering the acoustical beam.

Another advantage is that the sonar apparatus minimizes the detection of false objects and maximizes the detection of the true bottom by using a phased array technique for receiving a reflection of the acoustical beam.

These and other objects and advantages of the present invention will no doubt become obvious to those of ordinary skill in the art after having read the following detailed description of the preferred embodiments which are illustrated in the various figures.

IN THE DRAWINGS

FIG. 1 is a block diagram of the sonar apparatus of the present invention;

FIGS. 2a, 2b, and 2c are said, front, and top views, respectively, illustrating a first marine system including the sonar apparatus FIG. 1;

FIGS. 3a, 3b, and 3c are side, from, and top views, respectively, illustrating a second marine system using the sonar apparatus of FIG. 1;

FIGS. 4a, 4b, and 4c are side, front, and top views, respectively, illustrating a third marine system using the sonar apparatus FIG. 1;

FIGS. 5a and 5b illustrate visual displays provided by the sonar apparatus of FIG. 1;

FIG. 6 is a flow chart of a method in the sonar apparatus of FIG. 1 for scanning an underwater area with a steerable acoustical beam.

DETAILED DESCRIPTION OF THE PREFERRED EMBODIMENTS

Figure 1:
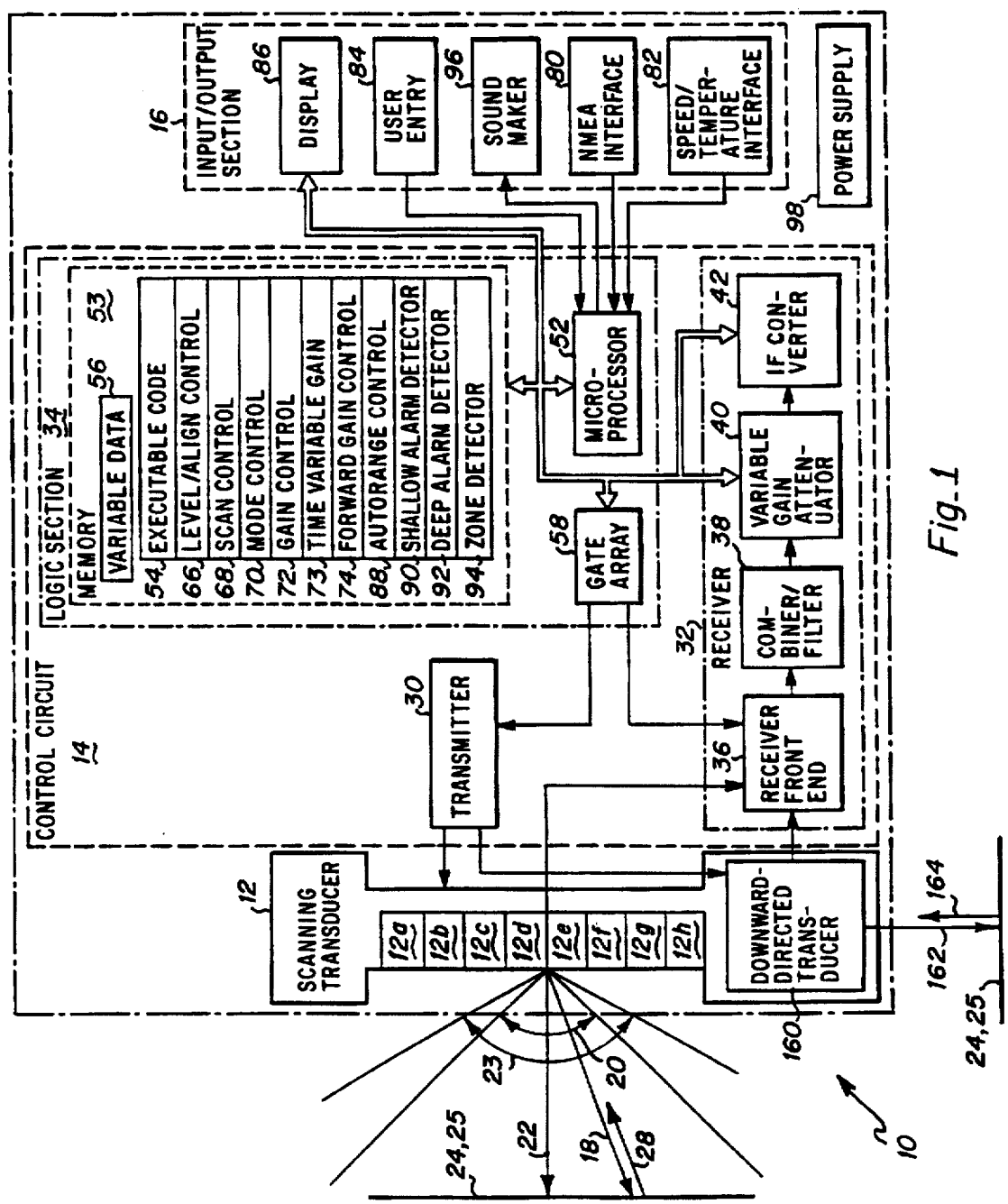

FIG. 1 illustrates a block diagram of a sonar apparatus of the present invention referred to herein by the reference number 10 and including a scanning transducer 12 having eight transducer elements 12a through 12h, a control circuit 14, and an input/output section 16. The control circuit 14 provides a conducted electrical transmit signal having eight parallel transmit signal components to the scanning transducer 12. In a preferred embodiment, the transmit signal components have a pulse width of approximately five hundred microseconds and a frequency of approximately 200 KHz. Each of the transducer elements 12a–h is connected to receive one of the transmit signal components and each signal component drives one of the elements 12a–h.

The scanning transducer 12 converts the electrical energy in the transmit signal component into a pulsed vibration having the same frequency, and relative phase as the signal component it receives. The combination of the vibrations of each of the transducer elements 12a–h generates the acoustical beam 18. The acoustical beam 18 is steered within a planar scan sector 20 by steering information contained in the relative phases. When the phases of the transmit signal components are equal, the acoustical beam 18 is steered in a nominal radiation direction 22 approximately in the center of an uncompensated planar scan section 23. The range of the scan sector 20 is selected from within the uncompensated scan sector 23. Typically, the angular range of the scan sector 20 is approximately ninety degrees.

When the acoustical beam 18 hits and reflects from an object 24, an acoustical reflection 28 echoes back to the scanning transducer 12 causing each of the transducer elements 12a–h to vibrate in sympathy and convert acoustical energy in the reflection 28 into a conducted electrical receive signal having eight receive signal components where each transducer element 12a–h provides One of the receive signal components. The object 24 may be a fish, an obstruction, a structure, or a bottom surface 25. The relative phases of the receive signal components indicate a direction from which the reflection 28 is received.

The width of the illumination angle for one-half power of the acoustical beam 18 in the plane of the scan sector 20 is approximately determined by the number of elements in the scanning transducer 12 according to a formula of one hundred five divided by the number of elements. In a preferred embodiment having eight transducer elements 12a–h, the one-half power angle is approximately thirteen degrees. Of course, a fewer or greater number of elements may be used for the present invention resulting in a larger or smaller angle. In the plane orthogonal to the scan sector 20, the width of the illumination angle for one-half power of the acoustical beam 18 is approximately determined by the physical lengths of the transducer elements 12a–h in the direction orthogonal to the scan sector 20. In a preferred embodiment, the one-half power angle for the acoustical beam 18 in the direction orthogonal to the scan sector 18 is approximately thirteen degrees.

The control circuit 14 includes a transmitter 30, a receiver 32, and a logic section 34. The transmitter 30 includes eight drivers wired in parallel for receiving a pulsed, 200 KHz transmit logic signal having eight transmit logic signal components from the logic section 34 and responding by issuing the pulsed, 200 KHz electrical transmit signal including the eight parallel transmit signal components to the scanning transducer 12 through eight drivers. The steering information for steering the acoustical beam 18 is contained in the relative phases of the transmit logic signal components and preserved in the relative phases of the transmit signal components. Each driver uses a HEXFET to drive a primary winding of an inductive transformer coil to step up the transmit signal component from an input signal of twelve volts to an output signal of approximately one thousand volts peak to peak to drive one of the transmit elements 12a–h.

The receiver 32 includes a receiver front end 36 including eight mixers, such as model "NE 602" commercially available from Philips Corporation, wired in parallel to receive the eight receive signal components, respectively. Each mixer mixes a local oscillator signal component from the logic section 34 with the 200 KHz receive signal component that it receives in order to provide a mixer output signal component at 455 KHz to a combiner/filter 38. The local oscillator signal components are generated to have relative phases corresponding to the relative phases in the transmit logic signal in order to be most sensitive for receiving the reflection 28 in a direction opposite to that selected for the acoustical beam 18. The combiner/filter 38 sums the mixer output signals in a resistor network and uses a standard radio ceramic to bandpass filter to pass frequencies near to 455 KHz. A variable gain attenuator 40 uses a resistive attenuator to set the gain of the filtered signal to a level determined in a control signal from the logic section 34 and passes a variable gain signal to an IF converter 42. The gain of the variable gain attenuator 40 is adjusted to control the sensitivity of the sonar apparatus 10 to the reflection 28. When the gain is low, more energy is required to detect a hit and when the gain is high, less energy is required. The IF converter 42 amplifies the variable gain signal with a standard radio IF receiver integrated circuit chip, digitizes the amplified signal with an analog to digital converter, and passes the digitized receive signal to the logic section 34.

The logic section 34 includes a microprocessor 52, a memory 53 including a read only memory (ROM) for storing executable code 54 and a random access memory for storing variable data 56, a gate array 58, and associated hardware. The microprocessor 52 operates in a conventional manner for receiving digital signals, operating upon these signals according to the executable code 54 and the variable data 56, and issuing digital signals as a result of the operations. The gate array 58 is pre-programmed in order to be controlled by the microprocessor 52 to provide the transmit logic signal components to the transmitter 30 and the local oscillator signal components to the receiver front end 36. The logic section 34 measures a time interval between the time that the transmit logic signal pulse is issued and the time that the digitized receive signal resulting from that pulse is received and calculates a direct distance to the object 24 using a known speed of an acoustical wave in water. The executable code 54 and/or the variable data 56 include geometric conversion instructions for converting between the steering information and the relative signal phases for steering the acoustical beam 18 in the selected direction. A downward distance (depth), a forward distance, a leftward distance, and/or a rightward distance is resolved from the direct distance and the geometrical conversion, thereby providing a relative location of the object 24.

The executable code 54 includes a level/align control 66 using geometric calculations to calibrate the steering information to position the scan sector 20 within the uncompensated scan sector 23 range of one hundred-twenty degrees. In a first preferred embodiment, the scanning transducer 12 is mounted so that the uncompensated scan sector 23 is parallel to a fore-aft plane 204 (FIGS. 2a–c) of a boat 202 (FIGS. 2a–c) and the nominal radiation direction 22 is aimed in a range of thirty degrees to sixty degrees downward. The level/align control 66 calibrates the steering information so that the scan sector 20 spans a forward looking range of ninety degrees from directly forward to directly downward. In a preferred method, the scan sector 20 is calibrated by first positioning the boat 202 (FIGS. 2a–c) over a flat portion of the bottom surface 25 and then adjusting the level/align control 66 to eliminate an apparent slope of the portion of the bottom surface 25. In a second preferred embodiment, the scanning transducer 12 is mounted so that the uncompensated scan sector 23 is parallel to an athwartship plane 304 (FIGS. 3a–c) of a boat 302 (FIGS. 3a–c) and the nominal radiation direction 22 is aimed in a range of fifteen degrees to the left to fifteen degrees to the right of directly downward. In a third preferred embodiment, the scanning transducer 12 is mounted so that the uncompensated scan sector 23 is in a forward sloping plane 416 (FIGS. 4a–c) having a planar angle of approximately twenty degrees downward from horizontal. The nominal radiation direction 22 is aimed in a range from fifteen degrees left to fifteen degrees right of a forward, downward sloping direction 418 (FIGS. 4a–c) in the forward sloping plane 416 (FIGS. 4a–c). The level/align control 66 calibrates the steering information so that the scan sector 20 spans a forward looking range of ninety degrees from forty-five degrees to the left to forty-five degrees to the right of the forward, downward sloping direction 418 (FIGS. 4a–c).

A scan control 68 provides the steering information for steering the acoustical beam 18 to a selectable center scan direction and for automatically scanning the acoustical beam 18 in angular steps through a selectable scan width centered at the center scan direction. Because the direction of the acoustical beam 18 is steered electronically, the scan width is selectable in a range from an arbitrarily small angle such as one-tenth degree to entire range of the uncompensated scan sector 23 in arbitrarily small increments, such as one-tenth degree depending upon the fineness of a user control. In a preferred embodiment the scan width is selectable in two degree increments from a minimum range of twelve degrees to a maximum range of the scan sector 20. The scan center direction is selectable within the uncompensated scan sector 23, preferably within the scan sector 20, in increments of one degree. A step size of the angular steps is controlled by a mode control 70. In a preferred embodiment, the mode control 70 includes a capability for a detail mode for scanning the scan width in angular steps of one degree, a normal mode for scanning the scan width in angular steps of two degrees, a fast mode for scanning the scan width in three degree steps, and a smart mode for scanning the scan width in angular steps having sizes that vary according to the direction that the acoustical beam 18 is steered. The mode control 70 includes a further capability for steering the acoustical beam 18 directly downward after each step in the detail mode, after each step in the normal mode, after every fifth step in the fast mode, and after every fifth step in the smart mode. The smart mode uses a step size of one degree when the acoustical beam 18 is aimed approximately forty-five degrees downward and gradually increases the step size to approximately three degrees as the acoustical beam 18 is steered upward or downward from that direction. Optionally, the mode control 70 may scan in arbitrarily small angular steps, such as one-tenth degree, or angular steps as large as the full uncompensated scan sector 23 either linearly or in an arbitrary pattern.

A gain control 72 in the executable code 54 controls the gain in the variable gain attenuator 40 to set the sensitivity of the receiver 32 to the reflection 28. When the gain is high, a weak reflection 28 is detected as a hit on the object 24. When the gain is low, the reflection 28 must be stronger to be detected. If the gain is too high, a false object may be detected and if the gain is too low a real object 24 may be missed. The gain control 72 includes a bottom gain control, a time variable gain control 73, and a forward gain control 74. The bottom gain control increases the gain until the bottom surface 25 is detected in a downward looking scan and reduces the gain if too many objects 24 are detected above the bottom surface 25. The time variable gain control 73 increases the gain as the time interval increases following the time that a pulse of the acoustical beam 18 is transmitted until the reflection 28 from that pulse is received. The forward gain control 74 increases the gain when a weighed average of a number of detections of the object 24 at a current direction of the acoustical beam 18 and a number of detections of the object 24 at a previous direction is less than a pre-determined number of detections as described in the detailed description of FIG. 7.

The input/output section 16 includes an optional NMEA interface 80 having an 80C52 microcontroller programmed for receiving National Marine Electronics Association (NMEA) messages including absolute location, waypoint locations, route between waypoints, ranges to waypoints, and/or bearings to waypoints from an external LOng RAnge Navigation (LORAN) or Global Positioning System (GPS) receiver and an optional speed/temperature interface 82 for receiving speed and/or temperature information from an external speed log and/or temperature measuring device. A user entry 84 operated by a human user provides a user entry signal to the logic section 34 to request certain operational and display modes that have been pre-programmed in the executable code 54. The logic section 34 processes the user entry signal for providing information for distance or relative location of the object 24, absolute location, waypoint information, speed, and temperature and issues selected information in a display signal. A display 86, including a liquid crystal display (LCD), receives the display signal and visually displays the selected information to the human user. An autorange control 88 in the executable code 54 adjusts the full-scale distance range so that the bottom surface 25 is less than one-half the full-scale distance range as it appears in the display 86 and to increase the range of gains provided by the time variable gain control 73, and thereby reduce the reduce the likelihood that a reflection from a sidelobe of the acoustical beam 18 will be detected as a hit on an object 24.

A shallow alarm depth, a deep alarm depth and/or a zone alarm may be entered through the user entry 84 and stored in the variable data 56. The executable code 54 includes a shallow alarm detector 90 to provide an alarm condition when a downward distance (depth) to the object 24 is less than the shallow alarm depth, a deep alarm detector 92 to provide an alarm condition when the downward distance to the object 24 is greater than the deep alarm depth, and a zone alarm detector 94 to provide an alarm condition when the downward distance to the object 24 is in a zone that is less than the shallow alarm depth and greater than the deep alarm depth. The logic section 34 issues an alarm signal for the alarm condition to a sound maker 96 included in the input/output section 16. The sound maker 96 includes a buzzer or speaker for making an audible sound when the alarm signal is received. A power supply 98 supplies power to the components of the sonar apparatus 10.

The third embodiment of the sonar apparatus 10, the scanning transducer 12 includes a downward-directed transducer element 160 for converting an electrical depthfinder transmit signal into a downward-directed acoustical beam 162 and for converting a reflection 164 of the acoustical beam 162 from the object 24 into an electrical depthfinder receive signal. In the third embodiment the scanning transducer 12 uses only seven transducer elements 12a through 12g, the transmit logic signal has seven instead of eight transmit logic signal components, the transmit signal has seven instead of eight transmit signal components, the local oscillator signal has seven instead of eight local oscillator signal components, and the receive signal has seven instead of eight receive signal components. The transmitter 30 allocates one of its eight drivers for issuing the depthfinder transmit signal to the downward-directed transducer element 160 in response to a depthfinder transmit logic signal generated by the logic section 34. The receiver front end 36 allocates one of its eight mixers for receiving the depthfinder receive signal and providing a depthfinder mixer output signal to the combiner/filter 38. The combiner/filter 38, the variable gain attenuator 40, and the IF converter 42 are controlled by the logic section 34 to time share between processing the electrical signals associated with the scanning transducer 12 and the electrical signals associated with the downward-directed transducer element 160.

FIGS. 2a, 2b, and 2c illustrate side, front, and top views, respectively, of a first marine system of the present invention referred to herein by the general reference number 200 and including the first embodiment of the sonar apparatus 10 (FIG. 1). The first marine system 200 includes the boat 202 having the fore-aft plane 204 including a forward direction 206, and a directly downward direction 212. The boat 202 is floating on water 214. The scanning transducer 12, such as a model 31-671-1-11 or 31-672-1-01 commercially available from Airmar Technology Corporation of Milford, N.H., is mounted to the underwater side of the boat 202 and oriented to have the uncompensated scan sector 23 and the scan sector 20 parallel to the fore-aft plane 204 and the nominal radiation direction 22 aimed nominally at forty-five degrees downward from the forward direction 206 in a range of thirty degrees to sixty degrees. The scan sector 20 is adjusted to cover the area between the forward direction 206 and the downward direction 212. The acoustical beam 18 from the scanning transducer 12 is steered by the steering information in a selected direction in the scan sector 20. The reflection 28 of the acoustical beam 18 echoes back from the object 24, such as a fish or the bottom surface 25, to the scanning transducer 12.

FIGS. 3a, 3b, and 3c illustrate side, front, and top views, respectively, of a second marine system of the present invention referred to herein by the general reference number 300 and including the second embodiment of the sonar apparatus 10 (FIG. 1). The second marine system 300 includes the boat 302 having the athwartship plane 304 including a left direction 308, a right direction 310, and a downward direction 312. The boat 302 is floating on water 314. The scanning transducer 12, such as a model 40-136 or 31-010-102 commercially available from Airmar Technology Corporation of Milford, N.H., is mounted to the underwater side of the boat 302 and oriented to have the uncompensated scan sector 23 and the scan sector 20 parallel to the athwartship plane 304 and the nominal radiation direction 22 aimed in a range of fifteen degrees to the left of the downward direction 312 to fifteen degrees to the right of the downward direction 312. The scan sector 20 is adjusted in the level/align control 66 to cover the area from forty-five degrees to the left of the downward direction 312 to forty-five degrees to the right of the downward direction 312. The acoustical beam 18 from the scanning transducer 12 is steered by the steering information in the sonar apparatus 10 in a selected direction in the scan sector 20. The reflection 28 of the acoustical beam 18 reflects from the object 24, such as a fish or the bottom surface 25, to the scanning transducer 12.

FIGS. 4a, 4b, and 4c illustrate side, front, and top views, respectively, of a third marine system of the present invention referred to herein by the general reference number 400 and including the third embodiment of the sonar apparatus 10 (FIG. 1). The marine system 400 includes a boat 402 having a fore-aft plane 404. The boat 402 is floating on water 414. The scanning transducer 12, such as a model 31-673-1-11 or 31-674-1-01 commercially available from Airmar Technology Corporation of Milford, N.H., is mounted to the underwater side of the boat 402 and oriented to have the uncompensated scan sector 23 and the scan sector 20 in the forward sloping plane 416 having a forward looking planar angle downward from the surface of the water 414 by approximately twenty degrees. The forward sloping plane 416 includes the forward, downward sloping direction 418 parallel to the fore-aft plane 404. The nominal radiation direction 22 is oriented to aim in a range from fifteen degrees left to fifteen degrees right of the forward, downward sloping direction 418. The scan sector 20 is adjusted in the level/align control 66 to cover the area from forty-five degrees to the left of the forward, downward sloping direction 418 to forty-five degrees to the right of the forward, downward sloping direction 418. The acoustical beam 18 from the scanning transducer 12 is steered by the steering information in the sonar apparatus 10 in a selected direction in the scan sector 20. The reflection 28 of the acoustical beam 18 echoes from the object 24, such as a fish, and/or a bottom surface 25, such as an underwater obstruction, to the scanning transducer 12.

The scanning transducer 12 further includes the downward-directed transducer element 160. The downward-directed transducer 160 is mounted to the underwater side of the boat 402 and oriented to transmit the downward-directed acoustical beam 162. The reflection 164 of the downward-directed acoustical beam 162 reflects from the object 24 and/or bottom surface 25 back to the downward-directed transducer element 160.

FIG. 5a illustrates a visual display provided by the sonar apparatus 10 of the present invention and referred to by the general reference number 500a. The visual display 500a includes a boat icon 502 representing a boat carrying the sonar apparatus 10 and a split screen showing a forward looking display 504 and a historical downward looking display 506. The forward looking display 504 includes a representation of the relative location of several objects 24 and the bottom surface 25. The historical display 506 shows a representation of the objects 24 that might be fish and the bottom surface 25 that the boat has passed over. A depth indicator 508 indicates a current depth of the bottom surface 25 beneath the boat of one-hundred three feet. A range indicator 510 indicates a display range in the forward looking display 504 of two hundred feet in a forward direction. Hash mark 512 represents a distance of one hundred feet in the forward direction. A range indicator 514 indicates a display depth range of two hundred feet in both the forward looking display 504 and the historical display 506. Hash marks 516, 518, and 520 represent depths of fifty, one hundred, and one hundred fifty feet, respectively. A speed indicator 524 indicates a current speed received from an optional external speed measuring device of one and eight-tenths miles per hour. A shallow alarm bar 526 and deep alarm bar 528 represent the shallow alarm depth and the deep alarm depth, respectively, selected by the user. The visual display 500a shows an alarm condition because a section 530 of the bottom surface 25 is above the shallow bar 526, another alarm condition because a section 532 of the bottom surface 25 is below the deep alarm bar 528, and another alarm condition because the a section 534 of the bottom surface 25 is above the shallow alarm bar 526 and below the deep alarm bar 528. The shallow bar 526 and/or the deep bar 528 can be horizontal as shown or sloped at an angle to horizontal.

The visual display 500a may be used with the level/align control 66 for adjusting the scan sector 20 to the correct level. When the boat 202 (FIGS. 2a–c) is positioned over a portion of the bottom surface 25 that is level, the user adjusts the scan sector 20 so that the forward looking display 504 displays the bottom surface 25 to have a level appearance.

FIG. 5b illustrates a visual display provided by the sonar apparatus 10 of the present invention and referred to by the general reference number 500b. The visual display 500b shows the object 24 and the bottom surface 25 on the split screen showing the forward looking display 504 and the historical downward looking display 506. Features indicated by reference numerals 508 to 524 are described in the detailed description of FIG. 5a. A scan width sector 540 indicates the scan width selected by the user. A scan center line 542 indicates the scan center direction selected by the user.

FIG. 6 illustrates a flow chart of a method in the present invention of the sonar apparatus 10 for scanning the selected scan width for finding the relative location of the object 24 underwater. Referring to FIGS. 2a–c, the scanning transducer 12, having multiple elements 12a–h, is mounted to the underside of the boat 202 beneath the waterline level and oriented so that the plane of the scan sector 20 is parallel to the fore-aft plane 204 and the nominal radiation direction 22 is in a range of thirty to sixty degrees downward from the forward direction 206 when the boat 202 is floating in the water 214. In a step 602 the user operates the user entry 84 for the scan control 68 to select the scan center direction and the scan width. A step 604 generates the steering information for selecting an initial direction of the acoustical beam 18 within the selected scan width and initializes a counter to zero. A step 606 issues the pulsed electrical transmit signal components having relative phases representative of the steering information. In a step 608 the scanning transducer 12 converts the electrical transmit signal components into the acoustical beam 18 in the selected direction. The acoustical beam 18 travels through the water and reflects from the object 24, such as a fish or the bottom surface 25 back to the scanning transducer 12. In a step 610 the scanning transducer 12 receives one or more reflections 28 from one or more objects 24, respectively. In a step 611 the scanning transducer 12 converts the reflection 28 into the electrical receive signal components. A step 612 generates the local oscillator signal components having the relative phases to select the reflection 28 having a direction opposite to that of the acoustical beam 18. A step 613 adjusts the sensitivity of the receiver 32 to the reflection 28 by adjusting the time variable gain, the bottom gain, and the forward gain. A step 614 measures the time interval between sending the pulse of the acoustical beam 18 and receiving the reflection 28. A step 616 calculates the direct distance to the object 24 from the time interval and the known speed of sound in water. A step 618 resolves the direct distance into a forward distance and a downward distance. In a step 620 the sonar apparatus 10 displays the relative location of the object 24 and the bottom surface 25. A step 622 increments the counter. A step 624 tests the counter. In the normal mode, if the counter is not two, then a step 626 generates the steering information to add an angular step of two degrees to the direction of the acoustical beam 18 and returns to the step 606. If the counter is two, then a step 628 resets the counter to zero and a step 630 generates the steering information to steer the acoustical beam 18 directly downward. A step 632 repeats the steps 606 to 616 in order to look directly downward. After the step 616, a step 634 displays the depth to the object 24 and the bottom surface 25 beneath the boat. A step 636 generates the steering information to steer the acoustical beam 18 by another two degree increment and returns to the step 606.

Figure 7:
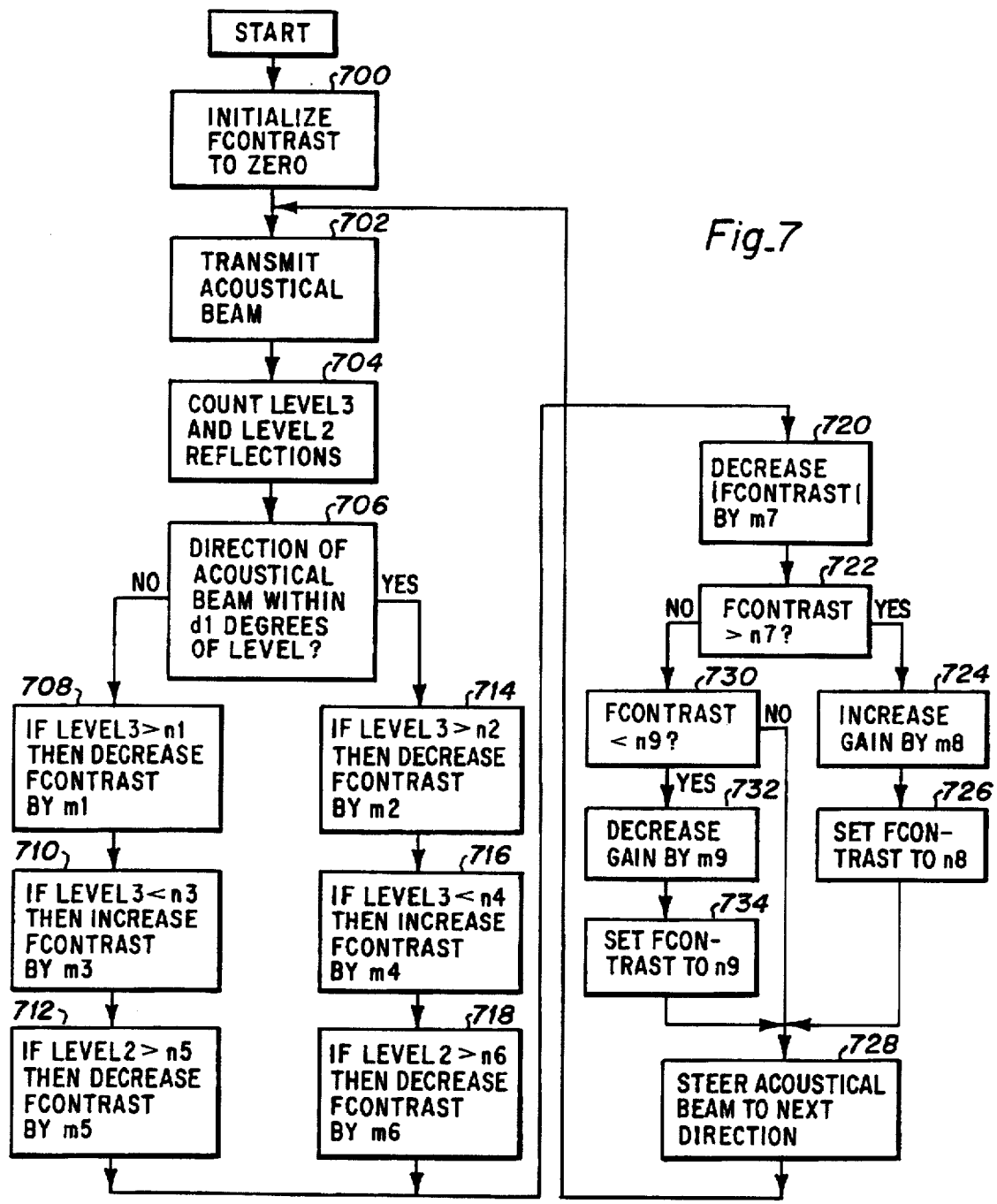
FIG. 7 is a flow chart of a method in the sonar apparatus of FIG. 1 for adjusting a sensitivity to a reflection of the acoustical beam of FIG. 6.

FIG. 7 illustrates a flow chart of a method used in the forward gain control 74 for adjusting the sensitivity of the sonar apparatus 10 to the reflection 28 by selecting one of thirty-two gains in the variable gain attenuator 40. Constants d1, m1–8, and n1–8 used in this method are pre-determined and stored in the executable code 54. A preferred list of constants have been determined empirically and are listed in a Table 1, below. Of course, other constants may work equally well. At a step 700 a variable "FCONTRAST" is initialized to zero and stored in the variable memory 56. During the operation of the sonar apparatus 10, FCONTRAST may have a positive or a negative value. At a step 702 the acoustical beam 18 is transmitted and one or more reflections 28 from one or more objects 24 are received. At a step 704 the energy in each of the reflections 28 is quantized into one of four energy levels with an energy3 representing the highest energy level and an energy2 the second highest energy level. The number of reflections 28 at energy3 is counted and the number of reflections at energy2 is counted. At a step 706 the method branches to a step 708 if the direction of the acoustic beam 18 has an angle greater than d1 degrees from level. At the step 708 FCONTRAST is decreased by m1 if the number of energy3's is greater than n1. At a step 710 FCONTRAST is increased by m3 if the number of energy3's is less than n3. At a step 712 FCONTRAST is decreased by m5 if the number of energy2's is greater than n5.

Returning to the step 706 the method branches to a step 714 if the direction of the acoustical beam 18 has an angle that is within d1 degrees of level. At the step 714 FCONTRAST is decreased by m2 if the number of energy3's is greater than n2. At a step 716 FCONTRAST is increased by m4 if the number of energy3's is less than n4. At a step 718 FCONTRAST is decreased by m6 if the number of energy2's is greater than n6.

At a step 720, the absolute value of FCONTRAST is decreased by m7. At a step 722 the method branches to a step 724 if FCONTRAST is greater than n7. The step 724 increases the gain of the variable gain attenuator 40 by m8. At a step 726 FCONTRAST is set to n8 and goes to a step 728. Returning to the step 722 the method branches to a step 730 if FCONTRAST is not greater than n7. The step 730 branches to the step 728 if FCONTRAST is not less than n9. If FCONTRAST is less than n9, the method branches to a step 732 to decrease the gain of the variable gain attenuator 40 by m9. At a step 734 FCONTRAST is set to n10 and the method goes to the step 728. At the step 728 the acoustical beam 18 is steered to the next direction in the scan and the method returns to the step 702.

TABLE 1

| d1 = 45° | m1 = 3 | n1 = 8 |
|---|---|---|
| | m2 = 5 | n2 = 6 |
| | m3 = 3 | n3 = 8 |
| | m4 = 5 | n4 = 6 |
| | m5 = 2 | n5 = 25 |
| | m6 = 3 | n6 = 20 |
| | m7 = 1 | n7 = 40 |
| | m8 = 1 | n8 = 10 |
| | m9 = 1 | n9 = −40 |
| | | n10 = −10 |

Although the present invention has been described in terms of the presently preferred embodiments, it is to be understood that such disclosure is not to be interpreted as limiting. Various alterations and modifications will no doubt become apparent to those skilled in the art alter having read the above disclosure. Accordingly, it is intended that the appended claims be interpreted as covering all alterations and modifications as fall within the true spirit and scope of the invention.

What is claimed is:

1. A method in a sonar apparatus for finding a relative location of an object, the method including steps of:

generating steering information for scanning said acoustical beam within a scan plane; and calibrating said steering information for scanning said acoustical beam in a 'scan sector within said scan plane, said scan sector having an approximate angular range bounded by one of (i) a level forward direction and a downward direction, (ii) a first direction corresponding to forty-five degrees left of said downward direction and a second direction corresponding to forty-five degrees right of said downward direction, and (iii) a first direction corresponding to forty-five degrees left from a forward, downward sloping direction and a second direction corresponding to forty-five degrees right from said forward, downward sloping direction; and issuing a transmit signal including said calibrated steering Information to a scanning transducer for scanning an acoustical beam over said scan sector.

2. A sonar apparatus having a steerable acoustical beam, comprising:

a control circuit for providing steering information to a scanning transducer for steering said acoustical beam; and scanning means coupled to the control circuit for receiving information for a directly selected scan width and a directly selected center scan direction and generating said steering information for automatically scanning said acoustical beam over said scan width about said center scan direction.

3. The sonar apparatus of claim 2 wherein:

the scanning means includes mode means for generating said steering information for automatically scanning said acoustical beam over said scan width in angular steps having a selectable step size.

4. A sonar apparatus having a steerable acoustical beam, comprising:

a control circuit for providing steering information to a scanning transducer for steering said acoustical beam in a selected direction; and scanning means coupled to the control circuit for generating said steering information for automatically scanning said acoustical beam over a scan width in angular steps having a first step size when said selected direction is a certain direction and having a second step size when said selected direction differs from said certain direction.

5. The sonar apparatus of claim 2, wherein:

the scanning means includes mode means for generating downward steering information for steering said acoustical beam in a downward direction and for automatically interspersing said downward steering information with said steering information for scanning said acoustical beam over said scan width.

6. A sonar apparatus having a steerable acoustical beam, comprising:

a control circuit for providing steering information to a scanning transducer for steering said acoustical beam; and level/align means coupled to the control circuit for calibrating said steering information to steer said acoustical beam within a scan sector having an approximate angular range bounded by at least one of (i) a level forward direction and a downward direction, (ii) a first direction corresponding to forty-five degrees left of said downward direction and a second direction corresponding to forty-five degrees right of said downward direction, and (iii) a first direction corresponding to forty-five degrees left from a forward, downward sloping direction and a second direction corresponding to forty-five degrees right from said forward, downward sloping direction.

7. The sonar apparatus of claim 2, further including:

a receiver coupled to said scanning transducer and having a sensitivity for receiving information for a distance to an object from a reflection of said acoustical beam from said object; and wherein the control circuit includes a forward gain control coupled to the receiver for selecting a sensitivity to said reflection from said acoustical beam in a current selected direction, said selected sensitivity based upon a weighted average of energy received in said reflection from said acoustical beam in said current selected direction and energy received in said reflection from said acoustical beam in a previous selected direction.

8. The apparatus of claim 4, wherein:

the scanning means is further for automatically scanning over said scan width in said angular steps having at least three step sizes determined according to said selected direction.

9. The sonar apparatus of claim 2, further including:

a shallow detector for receiving a shallow alarm depth, for receiving a downward distance, and providing an alarm signal when said downward distance is less than said shallow alarm depth; and a receiver coupled to said scanning transducer for receiving information for a distance to an object from a reflection of said acoustical beam from said object and providing distance determination information to the control circuit for said distance; and wherein:

the control circuit is further for resolving said distance determination information into said downward distance to said object representative of a depth and a second distance to said object orthogonal to said downward distance and providing information for said downward distance to the shallow detector.

10. The sonar apparatus of claim 2, further including:

a deep detector for receiving a deep alarm depth, receiving a downward distance, and providing an alarm signal when said downward distance is greater than said deep alarm depth; and a receiver coupled to the scanning transducer for receiving information for a distance to an object from a reflection of said acoustical beam from said object and providing distance determination information to the control circuit for said distance; and wherein:

the control circuit is further for resolving said distance determination information into said downward distance to said object representative of a depth and a second distance to said object orthogonal to said downward distance and providing information for said downward distance to the deep detector.

11. The sonar apparatus of claim 2, further including:

a zone detector for receiving a shallow alarm depth and a deep alarm depth, receiving a downward distance, and providing an alarm signal when said downward distance is less than said shallow alarm depth and greater than said deep alarm depth; and a receiver coupled to the scanning transducer for receiving information for a distance to an object from a reflection of said acoustical beam from said object and providing distance determination information to the control circuit for said distance; and wherein:

the control circuit is further for resolving said distance determination information into said downward distance to said object representative of a depth and a second distance to said object orthogonal to said downward distance and providing information for said downward distance to the zone detector.

12. The apparatus of claim 7, wherein:

the control circuit is further for recognizing when said object is a bottom surface and a strength of said reflection from said bottom surface; and said forward gain control is further for increasing said sensitivity as an angle between a horizontal direction and a downward direction increases until said bottom surface is recognized-and decreasing said sensitivity as said strength of said reflection from said bottom surface increases.

13. A sonar apparatus having a steerable acoustical beam, comprising:

a control circuit for issuing an electrical transmit signal for providing steering information to a scanning transducer for steering said acoustical beam in a selected direction; and a receiver coupled to the control circuit for receiving an electrical receive signal from said scanning transducer when a relative receive phase indicates that a direction of a reflection of said acoustical beam from an object is opposite to said selected direction, said receive signal including at least two receive component signals having said relative receive phase corresponding to said direction of said reflection.

14. A method in a sonar apparatus for finding a relative location of a bottom surface, the method including steps of:

issuing steering information to a scanning transducer for steering an acoustical beam;

receiving information for a distance to said bottom surface from said scanning transducer from a reflection of said acoustical beam from said bottom surface;

resolving said distance into a first distance to said bottom surface representative of a depth and a second distance to said bottom surface orthogonal to said first distance displaying a history of said depth on a first screen with a first scale and simultaneously displaying a current said depth on a second screen with said first scale, where said first scale on said second screen is adjacent and aligned to said first scale on said first screen, and a current said second distance on said second screen on a second scale orthogonal to said first scale in a visual form that is perceptible to a user.

15. A sonar apparatus having a steerable acoustical beam, the sonar apparatus comprising:

a control circuit for providing steering information to a scanning transducer for scanning said acoustical beam, receiving distance determination information for a distance to an object, and resolving said distance determination information into a downward distance and a second distance orthogonal to said downward distance;

a receiver having a variable sensitivity for receiving a signal indicative of said distance to said object from said scanning transducer from a reflection of said acoustical beam from said object including a bottom surface and providing said distance determination information to said control circuit;

a display having a first full-scale range and a second full-scale range, the display coupled to the control circuit for displaying a representation of said object at a display location that corresponds to said downward distance as a proportion of said first full-scale range and said second distance as a proportion of said second full-scale range; and an autorange control coupled to the display for adjusting said first and said second full-scale ranges in the same ratio for increasing a ratio of said sensitivity to said reflection from a far away said object represented on the display to said sensitivity to said reflection from a near said bottom surface represented on the display.

16. A sonar apparatus having a steerable acoustical beam, comprising:

circuit means for providing steering information to a scanning transducer for steering said acoustical beam, receiving information for a distance to a bottom surface from said scanning transducer from a reflection of said acoustical beam from said bottom surface, and resolving said distance information into a downward distance and a forward distance; and a display coupled to the control circuit for receiving information for said downward distance and said forward distance, the display including a historical screen for displaying a history of said downward distance to said bottom surface on a first scale and a forward-looking screen for displaying a current said downward distance to said bottom surface on said first scale and a current said forward distance to said bottom surface on a second scale orthogonal to said first scale, said forward-looking screen adjacent to said historical screen for aligning a most recent said history of said bottom surface with a nearest of said current bottom surface.

17. A method in a sonar apparatus for finding a relative location of an object, the method including steps of:

issuing a transmit signal to a scanning transducer for transmitting an acoustical beam;

receiving a receive signal from said scanning transducer with a receiver having a selectable sensitivity to said receive signal, said receive signal including information for a distance to an object including a bottom surface from a reflection of said acoustical beam from said object;

resolving said distance into a downward distance and a forward distance orthogonal to said downward distance;

displaying a representation of said object on a display with said downward distance represented on a first scale having a first full-scale range and said forward distance represented on a second scale having a second full-scale range;

determining when said object is said bottom surface; and increasing a ratio between a first said sensitivity to a first said reflection corresponding to a far away said object represented on said display and a second said sensitivity to a second said reflection corresponding to a near said bottom surface represented on said display by increasing said first and second full-scale ranges in the same proportion when said downward distance to said bottom surface is a large proportion of said first full-scale range.

18. The sonar apparatus of claim 2, wherein:

the control circuit is coupled to a downward-directed transducer element for issuing a second acoustical beam in a downward direction.

19. A marine sonar system having a steerable acoustical beam, the system comprising:

a boat;

a scanning transducer mounted to the underside of the boat for converting an electrical transmit signal having steering information into an acoustical beam having a selected direction in response to said steering information and converting a reflection of said acoustical beam from at least one object into an electrical receive signal;

a control circuit coupled to the scanning transducer for issuing said electrical transmit signal, receiving said electrical receive signal, and calculating a distance to said object; and a scan control for receiving information for a directly selected scan center direction and a directly selected scan width and coupled to the control circuit for providing said steering information based upon said scan center direction and said scan width for automatically scanning said acoustical beam over said scan width about said center scan direction.

20. A method in a sonar apparatus for finding a relative location of an object, the method including steps of:

issuing a transmit signal for providing steering information to a scanning transducer for steering said acoustical beam in a selected direction; and receiving a receive signal from said scanning transducer for a reflection of said acoustical beam from at least one object when a direction of said reflection is opposite to said selected direction, said receive signal including at least two receive component signals having a relative phase corresponding to said direction of said reflection.

21. further including a step of:
generating said steering information for scanning said acoustical beam in angular steps having angular step sizes based upon said selected direction.

22. The sonar system of claim 19, wherein:
the boat includes a fore-aft plane;
the scanning transducer includes a scan plane mounted approximately parallel to said fore-aft plane;
the control circuit further includes level/align means for calibrating said steering information to provide said selected direction within a scan sector within said scan plane, said scan sector having an approximate angular range bounded by a first direction corresponding to a level forward direction and a second direction corresponding to a downward direction.

23. The sonar system of claim 22, wherein:
the control circuit is further for resolving said distance to said object into a depth of said object in said downward direction and a forward distance to said object in said level forward direction and providing a display signal including relative location information for at least one of (i) said depth, (ii) said forward distance, and (iii) a history of said depth; and further including:
a display coupled to the control circuit for receiving said display signal and displaying said relative location information in a visual form that is perceptible to a user.

24. The sonar system of claim 19, wherein:
the boat includes an athwartship plane;
the scanning transducer includes a scan plane mounted approximately parallel to said athwartship plane;
the control circuit further includes level/align means for calibrating said steering information to provide said selected direction within a scan sector within said scan plane, said scan sector having an approximate angular range bounded by a left direction forty-five degrees left of a downward direction and a right direction forty-five degrees right of said downward direction.

25. The sonar system of claim 24, wherein:
the control circuit is further for resolving said distance to said object into a depth of said object in said downward direction and one of a leftward distance to said object in a leftward level direction from said boat or a rightward distance to said object in a rightward level direction from said boat and providing a display signal including relative location information for at least one of (i) said depth, (ii) said leftward distance, (iii) said rightward distance, and (iv) a history of said depth; and further including;
a display coupled to the control circuit for receiving said display signal and displaying said relative location information in a visual form that is perceptible to a user.

26. The sonar system of claim 19, wherein:
the boat includes a waterline plane;
the scanning transducer includes a scan plane mounted approximately in a forward sloping plane having a downward planar angle with said waterline plane and including a forward sloping direction; and
the control circuit further includes level/align means for calibrating said steering information to provide said selected direction within a scan sector within said scan plane, said scan sector having an approximate angular range bounded by a first angle corresponding to forty-five degrees left of said forward sloping direction and a second angle corresponding to forty-five degrees right of said forward sloping direction.

27. The sonar system of claim 26, wherein:
the control circuit is further for resolving said distance to said object into a forward distance to said object and one of a leftward distance to said object and a rightward distance to said object and providing a display signal including relative location information for at least one of (i) said forward distance, (ii) said leftward distance, and (iii) said rightward distance; and further including;
a display coupled to the control circuit for receiving said display signal and displaying said relative location information in a visual form that is perceptible to a user.

28. The sonar system of claim 27, wherein:
the scanning transducer includes a downward-directed transducer element for converting a second electrical transmit signal into a downward-directed acoustical beam and converting an upward reflection of said downward-directed acoustical beam from at least one downward-located object into a second electrical receive signal; and
the control circuit is coupled to the downward-directed transducer element for issuing said second transmit signal, receiving said second receive signal, and calculating a distance to said downward-located object.

29. A method in a sonar apparatus for finding a relative location of an object, the method including steps of:
receiving information for a directly selected scan width and a directly selected center scan direction;
generating steering information in response to said scan width and said scan center direction; and
issuing a transmit signal including said steering information to a scanning transducer for scanning an acoustical beam over said scan width about said center scan direction.

30. The method of claim 29, wherein:
the step of receiving a scan width and center scan direction includes a step of receiving said scan width in a range of ninety degrees to one degree with a scan width increment in a range of ninety degrees to one degree.

31. The method of claim 29, wherein:
the step of receiving a scan width and center scan direction includes a step of receiving said center scan direction having a center scan direction increment in a range of ninety degrees to one degree.

32. The method of claim 29, further including steps of:
receiving a receive signal including distance determination information for a distance to an object from a reflection of said acoustical beam from said object;
resolving said distance determination information into a first distance to said object representative of a depth and a second distance to said object orthogonal to said first distance;
receiving information from a user for a shallow alarm depth; and
issuing an alarm signal when said depth is less than said shallow alarm depth.

33. The method of claim 29, further including steps of:
receiving a receive signal including distance determination information for a distance to an object from a reflection of said acoustical beam from said object;
resolving said distance determination information into a first distance to said object representative of a depth and a second distance to said object orthogonal to said first distance;

receiving information from a user for a deep alarm depth; and issuing an alarm signal when said depth is greater than said deep alarm depth.

34. The method of claim 29, further including steps of:

receiving distance determination information from said scanning transducer for a reflection of said acoustical beam from an object; and selecting a sensitivity to said reflection from said acoustical beam in a current selected direction, said selected sensitivity based upon a weighted average of energy received in said reflection from said acoustical beam in said current selected direction and energy received in said reflection from said acoustical beam from a previous selected direction.

35. The method of claim 29, further including a step of;

generating steering information for an angular step size in a range of one-tenth degree to ninety degrees for scanning said acoustical beam over said scan width in angular steps having said angular step size.

36. The method of claim 34, further including steps of:

recognizing when said object is a bottom surface;

determining a strength of said reflection from said bottom surface;

increasing said sensitivity as an angle between as said current selected direction and a horizontal direction increases until said bottom surface is recognized; and decreasing said sensitivity as said strength of said reflection from said bottom surface increases.

37. The method of claim 29, further including steps of:

receiving a receive signal including distance determination information for a distance to an object from a reflection of said acoustical beam from said object;

resolving said distance determination information into a first distance to said object representative of a depth and a second distance to said object orthogonal to said first distance;

receiving information from a user for a shallow alarm depth and a deep alarm depth; and issuing an alarm signal when said depth is in a zone that is less than said shallow alarm depth and greater than said deep alarm depth.

38. The method of claim 29, wherein:

the step of generating said steering information includes steps of generating downward steering information for steering said acoustical beam in a downward direction and a step of automatically interspersing said downward steering information with said steering information for scanning said acoustical beam in response to said scan width and said center scan direction.

39. The method of claim 29, further including a step of:

issuing a second electrical transmit signal to a downward-directed transducer element for a downward-directed acoustical beam.

\* \* \* \* \*